(12) United States Patent
Lehir et al.

(10) Patent No.: US 7,215,057 B2
(45) Date of Patent: May 8, 2007

(54) COMMUTATOR HOUSING FOR AN ELECTRIC MOTOR

(75) Inventors: Michel Lehir, Conde sur Noireau (FR); Stephane Omelezuk, Meslay (FR); Herve Laurandel, Herouville Saint Clair (FR); Philippe Mercadal, Caen (FR); Francois Breynaert, Caen (FR); Hermann Yvetot, Saint Denis de Mere (FR); Benoit Bazin, Tinchebray (FR)

(73) Assignee: ArvinMeritor Light Vehicle Systems - France, Sully-sur-Loire (FR)

( * ) Notice: Subject to any disclaimer, the term of this patent is extended or adjusted under 35 U.S.C. 154(b) by 0 days.

(21) Appl. No.: 11/045,499

(22) Filed: Jan. 28, 2005

(65) Prior Publication Data

US 2005/0200231 A1   Sep. 15, 2005

(30) Foreign Application Priority Data

Jan. 30, 2004   (FR) .................................. 04 00910

(51) Int. Cl.
*H02K 13/00* (2006.01)
(52) U.S. Cl. ........................ 310/239; 310/310; 310/242
(58) Field of Classification Search ................ 310/239, 310/240, 241, 242
See application file for complete search history.

(56) References Cited

U.S. PATENT DOCUMENTS

| 4,404,488 | A |   | 9/1983 | Herr |
| 4,596,941 | A |   | 6/1986 | Kluck |
| 4,694,214 | A | * | 9/1987 | Stewart, Sr. ................. 310/239 |
| 5,004,943 | A | * | 4/1991 | Gagneux ..................... 310/239 |

FOREIGN PATENT DOCUMENTS

| DE | 37 31 409  | 4/1989 |
| DE | 101 48 705 | 4/2003 |
| FR | 2 814 868  | 10/2000 |
| GB | 2 256 536  | 12/1992 |

OTHER PUBLICATIONS

French Search Report dated Sep. 10, 2004.

* cited by examiner

*Primary Examiner*—Darren Schuberg
*Assistant Examiner*—Nguyen N. Hanh
(74) *Attorney, Agent, or Firm*—Carlson, Gaskey & Olds

(57) ABSTRACT

A commutator housing for an electric motor includes a support to receive a commutator having at least two integrated stops and at least two brushes each fixed on a spring component. The spring components force the brushes into a contact position against the commutator. The stops hold the spring components in a mounting position in which the brushes are distanced from the contact position.

6 Claims, 2 Drawing Sheets

COMMUTATOR HOUSING FOR AN ELECTRIC MOTOR

REFERENCE TO RELATED APPLICATION

This application claims priority to French Patent Application FR 04 00 910 filed on Jan. 30, 2004.

BACKGROUND OF THE INVENTION

This invention relates generally to a commutator housing for an electric motor and a method for mounting the commutator in the commutator housing. In particular, the invention applies to an electric motor designed to drive motor vehicle equipment, such as a window regulator, a sunroof or a seat operation motor, for example.

French Patent 2,814,868 discloses an electric motor including a commutator.

A commutator usually includes a ring having a series of conductive segments around its circumference. The commutator ring is designed to be securely mounted on a rotor shaft.

An electric motor generally includes a stator frame and a rotor rotatably mounted in the stator. The motor also includes windings that are integral with the rotor shaft. Each winding is electrically connected to two diametrically opposed segments of the commutator.

The commutator is generally mounted in a commutator housing integral with the stator. The commutator housing includes a support having a central opening designed to receive the commutator and to allow the rotor shaft to pass through the support. The support is made of an insulating material, for example plastic.

The commutator housing also includes at least one pair of brushes that are diametrically opposed relative to the commutator and designed to contact the segments of the commutator during the rotation that is linked to the rotor shaft. The brushes are electrically connected to a supply of electric current.

When the motor, and in particular the commutator, is mounted in the commutator housing, the brushes must be prevented from contacting the commutator segments. Then, when mounting is complete, the brushes must be brought into contact with the commutator segments. The mechanical contact between the brushes and the commutator segments must be correctly ensured to guarantee satisfactory electrical contact with the windings connected to the segments.

Thus, the brushes of the commutator housing must be held in a first mounting position during the positioning of the commutator, and then the brushes must be held in a second contact position to ensure the brushes supply electricity to the commutator segments.

A commutator housing is known, for example installed on motors marketed by the assignee and listed under reference 420143. The commutator housing includes a device for locking the brushes. The housing of the prior art is illustrated schematically in FIGS. 1a and 1b, which shows the brushes in a mounting position and in a contact position, respectively.

The housing includes a plastic support 1 in which two casings 8 receiving brushes 5 are arranged. Each brush 5 includes an electrical connection formed by a copper braid 6 (a single connection is shown). The housing shown does not include a commutator, but has a central opening 2 designed to receive the commutator ring and the rotor through-shaft.

In the mounting position shown in FIG. 1a, the brushes 5 are retracted to the rear of the casing 8 and located on the opposite side of the opening 2 that is designed to receive the commutator. A spring 9 holds each brush 5 in the retracted mounting position.

In the contact position shown in FIG. 1b, the brushes 5 are housed in the casing 8, and the spring 9 provides pressure on the back of the brush 5 to push the brush 5 towards the commutator.

Thus, the spring 9 has the double function of holding the brush 5 in the mounting position and then in the contact position. However, the spring 9 constitutes a separate part from the plastic support 1 of the housing. It must therefore be manufactured separately and then mounted on the housing. Moreover, the bearing point of the spring 9 must be placed manually on the top of or on the back of the brush 5 to place the brush 5 in the mounting position and then the contact position. Moreover, the electrical connection of the brush 5 is also ensured by an additional component formed by the copper braid 6.

The numerous parts required for the satisfactory operation of the commutator housing increase its cost and complicate its production. Moreover, the movement of the brushes 5 from the mounting position to the contact position requires the manual intervention of an operator.

There is therefore a need for a simplified commutator housing that allows the brushes to be moved from a mounting position to a contact position in a simple, efficient and automatic manner.

SUMMARY OF THE INVENTION

The present invention provides a commutator housing for an electric motor including a support designed to receive a commutator. The commutator housing includes at least two integrated stops and at least two brushes fixed to spring components. The spring components force the brushes into a contact position against the commutator, and the stops hold the spring components in a mounting position in which the brushes are distanced from the contact position.

According to one embodiment, at least one of the spring components is a flexible segment. According to another embodiment, at least one of the spring components is electrically conductive. According to one embodiment, the commutator housing also includes a printed circuit to which the conductive spring components are connected.

According to one embodiment, the spring components supply electricity to the brush to which it is fixed. According to another embodiment, the spring components have a bearing zone near each stop that allows the spring components to release by local deformation of the support. According to one embodiment, the support includes at least one cut-out on which the stop is arranged.

The invention also provides a method for mounting a commutator in a commutator housing including the steps of mounting the commutator on a support of the commutator housing and releasing spring components of the commutator housing to force brushes against the commutator.

According to one embodiment, local deformation of the support causes the spring components to release. According to another embodiment, an automatic mechanism causes the spring components to release.

Other characteristics and advantages of the invention will become apparent when reading the following detailed description of embodiments of the invention, given as an example only and with reference to the drawings.

DETAILED DESCRIPTION OF PREFERRED EMBODIMENTS

The commutator housing according to the present invention includes a support designed to receive a commutator and at least two brushes each fixed to a spring component. The housing also includes stops that are integrated into the support.

The spring components force the brushes into a contact position against the commutator, and the stops hold the spring components in a mounting position in which the brushes are distanced from the contact position.

The stops on the support do not constitute additional parts, but are integrated into the support. They can be made in one piece with the support of the housing. The design and the production of the support of the housing are therefore simplified.

The spring components are integral with the brushes and force the brushes into the contact position. It is therefore not necessary to modify the bearing point of the spring components to place the brushes in the contact position. It is sufficient to release them from the hold of the stop. This operation can be carried out automatically, simplifying the mounting of the housing in a motor.

Figure 1A:
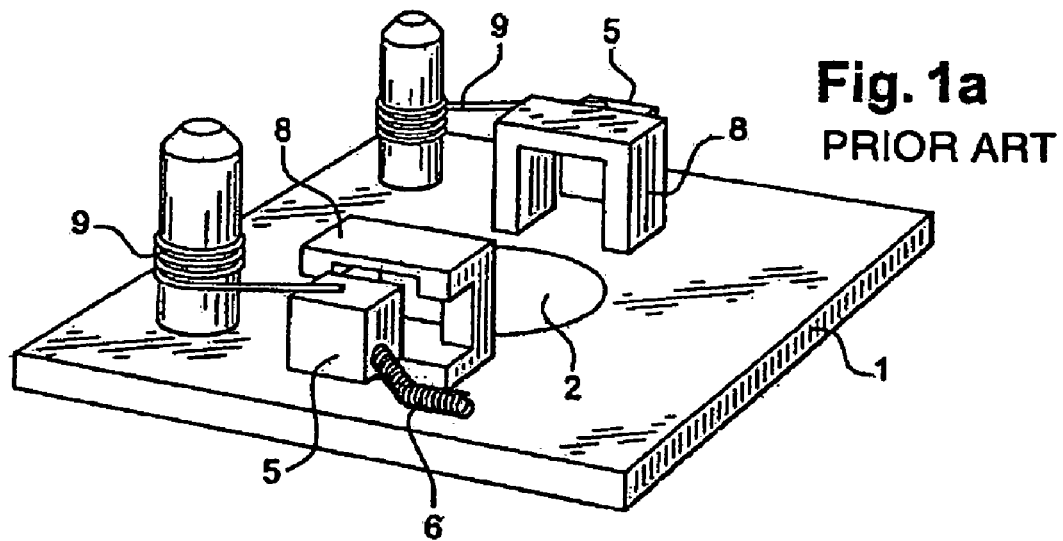
FIG. 1a, already described, is a diagram of a commutator housing according to the prior art with brushes in a mounting position.
Figure 1B:
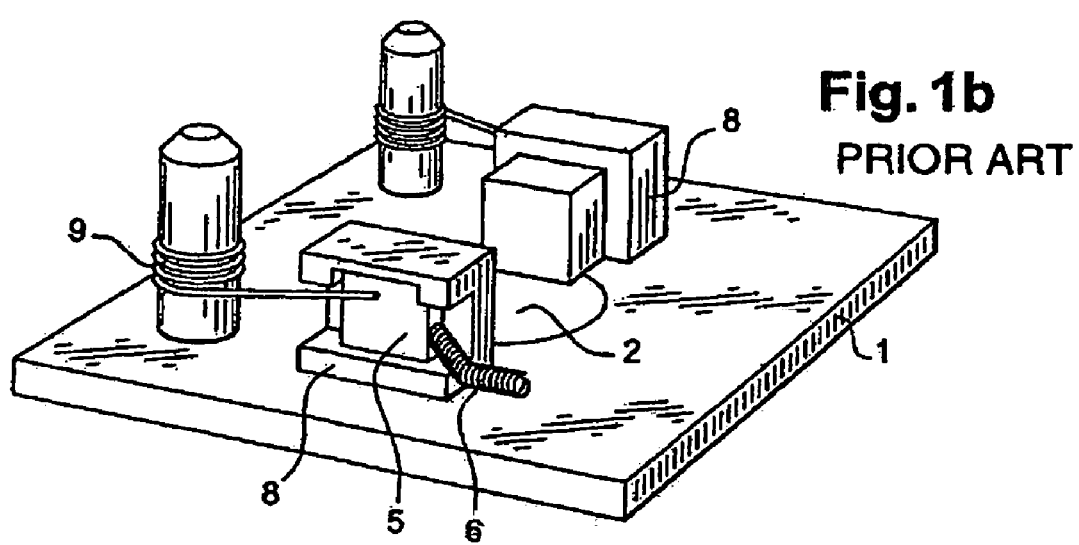
FIG. 1b, already described, is a diagram of the commutator housing according to the prior art with the brushes in a contact position.
Figure 2:
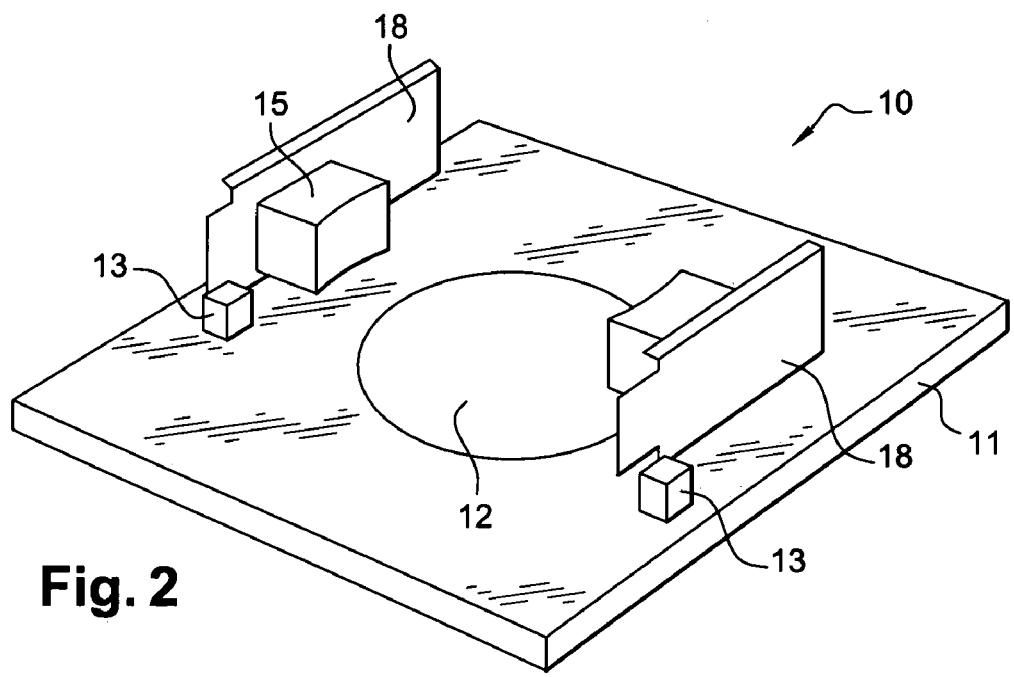
FIG. 2 is a diagram of a commutator housing according to the present invention with one brush in a mounting position and one brush in a contact position.

The components of the commutator housing 10 are shown in FIG. 2. The commutator housing 10 includes a support 11 having a central opening 12 designed to receive a commutator ring and a rotor through-shaft. The commutator housing 10 also includes brushes 15. Two brushes 15 are shown, but the commutator housing 10 can be equipped with three, four or more brushes.

The support 11 includes integrated stops 13. The support 11 can, for example, be made of plastic or any other insulating material that has a certain flexibility. Preferably, the support 11 is made of molded plastic, and the stops 13 are directly molded with the support 11. That is, the stops 13 are integrated in the support 11.

The commutator housing 10 also includes spring components 18 on which each of the brushes 15 is fixed. In the example illustrated, the spring components 18 are flexible segments bonded to or welded to a surface of each brush 15 that is opposite to the surface intended to contact the commutator.

Each spring component 18 includes an end edge fixed to the support 11 and a free end edge that can be placed against the stop 13 on the support 11. The fixing point of the spring components 18 on the support 11 is determined so that, when not stressed, the spring components 18 place each the brush 15 in the contact position (right-hand brush in FIG. 2).

Each spring component 18 is flexible so that the free end can abut against the stop 13 on the support 11 to keep the brush 5 away from the contact position, i.e., in a mounting position (left-hand brush in FIG. 2).

The support 11 has a certain flexibility that allows the free end of the spring component 18 to be released from the stop 13 by local deformation. The spring components 18 then push each brush 15 into the contact position with the commutator.

Figure 3:
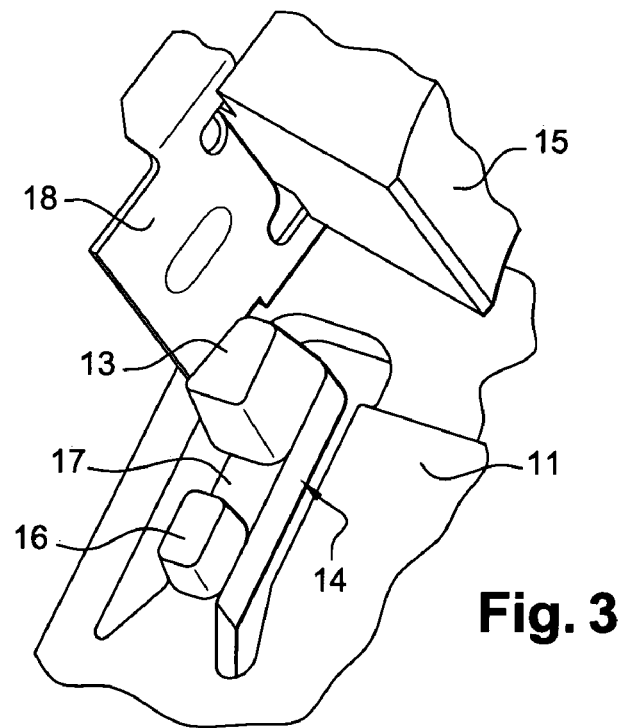
FIG. 3 is a detailed schematic view of a brush held in the mounting position on the commutator housing according to the present invention.

FIG. 3 gives a detailed schematic view of an embodiment of the invention with the brush 15 in a mounting position. The stop 13 is formed by a stud arranged on a cut-out 14 in the support 11. The spring component 18 on which one of the brushes 15 is fixed abuts against the stop 13. The cut-out 14 and the stop 13 are molded with the plastic support 11 using a suitable mold.

The bending of the cut-out 14 allows the stop 13 to be lowered sufficiently to release the end of the spring components 18, which will then push the respective brush 15 into the contact position with the commutator. Another projecting component 16 can be provided on the cut-out 14 to define a bearing zone 17 for the bending of the cut-out 14. The other projecting component 16 can be another small stud, as shown in FIG. 3, or it can take any other suitable form, such as a tongue or a rib, for example.

Moreover, the spring components 18 can be electrically conductive, for example, made up of copper plates. The spring components 18 can then serve as an electrical connection to further simplify the commutator housing by combining the functions of bringing the brushes 15 into contact with the commutator and supplying the brushes 15 with electricity. The spring components 18 are then welded or bonded to the brushes 15 with a material or a conductive adhesive.

The commutator housing 10 can also include other components (not shown), such as capacitors, coils or resistors, for example, to form an interference filter or to produce an impedance match with the motor for which the commutator housing 10 is intended. The commutator housing 10 can also include a printed circuit to which the spring components 18 are connected. The support 11 may serve as a board to the printed circuit or the printed circuit board can be arranged perpendicular to the support 11.

Depending on the embodiments and the arrangement of the different components on the commutator housing 10, only certain spring components 18 can be conductive, and the brushes 15 are then electrically connected by conventional copper braids. Alternately, all of the spring components 18 can be conductive.

The brushes 15 can be brought into contact with the commutator in the commutator housing 10 according to the invention in the following way. A commutator housing 10 as described previously is provided with the spring components 18 abutting the stops 13 on the support 11. The brushes 15 are therefore in the mounting position. A commutator can then be mounted on the support 11 of the commutator housing 10, in the position provided for this purpose. The ends of the spring components 18 are then released from the stops 13, which pushes and forces the brushes 15 against the commutator in the contact position.

According to one embodiment of the invention, an automatic mechanism can release the spring components 18. According to the embodiment described with reference to FIG. 3, for example, an automatic arm can press on the cut-out 14 to bend this portion of the support 11 and release the free end of the spring components 18 from the stop 13. For example, the cut-out 14 can include another projecting component 16 near to the stop 13 to define a bearing zone 17 for the automatic arm.

Of course, this invention is not limited to the embodiments described as an example. Thus, the commutator housing according to the invention is illustrated with a stop in the form of a stud on the support and a spring component in the form of a flexible segment, but the invention could be embodied with a stop in the form of a step and/or with a spring component in the form of a tongue or any other suitable form.

Similarly, the commutator housing according to the invention is illustrated with two brushes, but it can be easily modified within the scope of the invention in order to be used in motors requiring three, four or more brushes.

Although preferred embodiments of the present invention have been disclosed, a worker of ordinary skill in this art would recognize that certain modifications would come within the scope of this invention. For that reason, the following claims should be studied to determine the true scope and content of this invention.

What is claimed is:

1. A commutator housing for an electric motor, the commutator housing comprising:
    a support to receive a commutator, the support including at least two integrated stops that are each formed by a stud arranged at one extremity on a cut-out in the support;
    at least two brushes; and
    at least two spring components each formed by a flexible segment,
    wherein each of the at least two brushes are fixed on one of the flexible segments and each of the flexible segments force one of the at least two brushes into a contact position against the commutator,
    wherein each of the at least two integrated stops hold one of the flexible segments in a mounting position when the at least two brushes are distanced from the contact position, and
    wherein the flexible segments are released from the mounting position by pressure provided on the cut-outs in the support, wherein the pressure is applied from a side of the support including the at least two integrated stops.

2. The commutator housing according to claim 1, wherein at least one of the flexible segments is electrically conductive.

3. The commutator housing according to claim 2, wherein the at least one of the flexible segments that is electrically conductive supplies electricity to one of the at least two brushes.

4. The commutator housing according to claim 1, wherein the support includes a bearing zone near each of the at least two integrated stops to allow the flexible segments to release by local deformation of the support.

5. A method of mounting a commutator in a commutator housing, the method comprising the steps of:
    providing a commutator housing including a support to receive a commutator having at least two integrated stops each formed by a stud arranged at one extremity on a cut-out in the support and at least two brushes each fixed on a separate flexible segment, wherein each of the flexible segments force one of the at least two brushes into a contact position against the commutator, and wherein the at least two integrated stops hold the flexible segments in a mounting position where the at least two brushes are distanced from the contact position;
    mounting the commutator on the support of the commutator housing; and
    releasing the flexible segments by providing pressure on the cut-outs in the support to force the at least two brushes against the commutator, wherein the pressure is applied from a side of the support including the at least two integrated stops.

6. The method according to claim 5, wherein the step of releasing the flexible segments is caused by an automatic mechanism.

* * * * *